(12) United States Patent
Hakamata et al.

(10) Patent No.: US 10,733,319 B2
(45) Date of Patent: Aug. 4, 2020

(54) NON-TRANSITORY COMPUTER-READABLE STORAGE MEDIUM, DATA GENERATING METHOD, AND DATA GENERATING APPARATUS

(71) Applicant: FUJITSU LIMITED, Kawasaki-shi, Kanagawa (JP)

(72) Inventors: Yukari Hakamata, Yokohama (JP);
Junki Hakamata, Yokohama (JP);
Masahiro Kataoka, Kamakura (JP);
Kota Natsume, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 15/927,161

(22) Filed: Mar. 21, 2018

(65) Prior Publication Data
US 2018/0276399 A1    Sep. 27, 2018

(30) Foreign Application Priority Data

Mar. 23, 2017   (JP) .................................. 2017-057364

(51) Int. Cl.
*G06F 21/62*    (2013.01)
*G06F 21/60*    (2013.01)

(52) U.S. Cl.
CPC ........ *G06F 21/6227* (2013.01); *G06F 21/602* (2013.01); *G06F 21/6245* (2013.01)

(58) Field of Classification Search
CPC .................................................. G06Q 20/322
See application file for complete search history.

(56) References Cited

U.S. PATENT DOCUMENTS

2018/0101687 A1*  4/2018  Hakamata ............. G06F 21/608
2019/0036887 A1*  1/2019  Miller .................... G07C 9/20

FOREIGN PATENT DOCUMENTS

JP    2012-043242    3/2012
JP    2013-149056    8/2013

* cited by examiner

*Primary Examiner* — Simon P Kanaan
(74) *Attorney, Agent, or Firm* — Fujitsu Patent Center

(57) ABSTRACT

A non-transitory computer-readable storage medium storing a program to execute a process including acquiring a first data file including a plurality of first records each having a first data value of a first data item and a second data value of a second data item, generating first association information indicating a correspondence between a plurality of first data values and coded data values, encoding the first data file, encrypting the first association information, obtaining a plurality of data values of the second data item in a second data file, specifying the plurality of first data values, in the plurality of first records, corresponding to the plurality of data values in the second data files, specifying a plurality of coded data values, in the encoded first data file, corresponding to the plurality of specified first data values, and merging the second data file and the plurality of specified coded data values.

12 Claims, 13 Drawing Sheets

FIG. 13

The 2016 year
Income tax withholding slip for Employment income

— 60

| Residence or domicile | 871 2ND AVE. NY... | | Individual Number | 1234567890012 | | |
|---|---|---|---|---|---|---|
| Name | John Smith | | | | | |
| Amount of your revenues paid by the employer | | Amount of earnings after deduction for employment income | | Total amount of exemptions and deductions from incomes | | Income tax amount withheld by the employer |
| 千 | 円 | 千 | 円 | 千 | 円 | 千 | 円 |
| 2 0 | 0 | 2 0 | 0 | 2 0 | 0 | 2 0 | 0 |

Employee's (your)

| Regarding spouse qualified for exemption | Name | Mary Smith | Individual Number | 4567890012345 |
|---|---|---|---|---|
| Regarding persons qualified for exemption | Name | Tom Smith | Individual Number | 6789001234567 |
| | Name | | Individual Number | |
| | Name | | Individual Number | |

NON-TRANSITORY COMPUTER-READABLE STORAGE MEDIUM, DATA GENERATING METHOD, AND DATA GENERATING APPARATUS

CROSS-REFERENCE TO RELATED APPLICATION

This application is based upon and claims the benefit of priority of the prior Japanese Patent Application No. 2017-57364, filed on Mar. 23, 2017, the entire contents of which are incorporated herein by reference.

FIELD

The embodiments discussed herein are related to a non-transitory computer-readable storage medium, a data generating method, and a data generating apparatus.

BACKGROUND

Personal information managed by computers include especially highly confidential information. For example, countries allocate a number to each member to integrally manage information concerning social security and tax payment. The number allocated to each member is called an Individual Number, which is nicknamed as My Number (registered trademark) in Japan. Companies use the Individual Numbers of employees for, for example, tax withholding of income taxes of the employees. Many companies manage the Individual Numbers of the employees using computers.

However, storage of the Individual Numbers in computers increases the risk of external leakage of the Individual Numbers. Individuals are capable of being uniquely identified using the Individual Numbers and the Individual Numbers may be abused for fraud or the like if the Individual Numbers leak out to malicious persons. Accordingly, by law, personal information including the Individual Number is defined as specific personal information, which is obliged to be securely managed. The secure management includes encryption and storage of access logs.

As a technology to encrypt information for management, for example, an encrypted document creating apparatus is proposed, which creates an encrypted document in which only desired portions are encrypted without creating a plaintext document. In addition, a name identification method is also proposed, which enables a name identification process while keeping the personal information confidential. For example, refer to Japanese Laid-open Patent Publication No. 2012-043242 and Japanese Laid-open Patent Publication No. 2013-149056.

SUMMARY

According to an aspect of the disclosure, a non-transitory computer-readable storage medium storing a program that causes a computer to execute a process, the process including acquiring a first data file including a plurality of first records each having a first data value of a first data item and a second data value of a second data item, generating first association information indicating a correspondence between each of a plurality of first data values of the first data item and coded data values, encoding the first data file based on the first association information, the encoded first data file including the coded data values corresponding to the plurality of first data values included in the plurality of first records, encrypting the first association information, obtaining a plurality of data values of the second data item included in a second data file including a plurality of second records each having the data value of the second data item, specifying the plurality of first data values, included in the plurality of first records, corresponding to the plurality of data values included in the second data files, specifying a plurality of coded data values, included in the encoded first data file, corresponding to the plurality of specified first data values, merging the plurality of second records and the plurality of specified coded data values, and outputting a third data file in which the plurality of second records and the plurality of specified coded data values are merged.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an example of a form to be printed.

DESCRIPTION OF EMBODIMENTS

In use of highly confidential information, information (mixed information) may be generated, in which the highly confidential information is mixed with other information. For example, when a form using the Individual Numbers is created in an organization, such as a company, the personal information other than the Individual Numbers is combined with the Individual Numbers to create the form, which is the mixed information. Since the Individual Numbers are stored in an encrypted file in the creation of a form, the file is first decoded with a computer to extract the Individual Number of a specific person. The computer encrypts the extracted Individual Number again and combines the Individual Number with the other personal information to create the form.

However, since an encrypted file including the Individual Numbers is decoded in the generation of the mixed information, such as a form, in related art, the security of the Individual Numbers is reduced. This is not limited to the Individual Numbers and is a common problem for information that is encrypted for management but may be used with being combined with other information.

In one aspect, the present disclosure is provided to improve the security of information that is encrypted for management when the information that is encrypted for management is mixed with other information.

Embodiments will herein be described with reference to the drawings. Multiple embodiments may be combined within a consistent range.

First Embodiment

A first embodiment will now be described.

Figure 1:
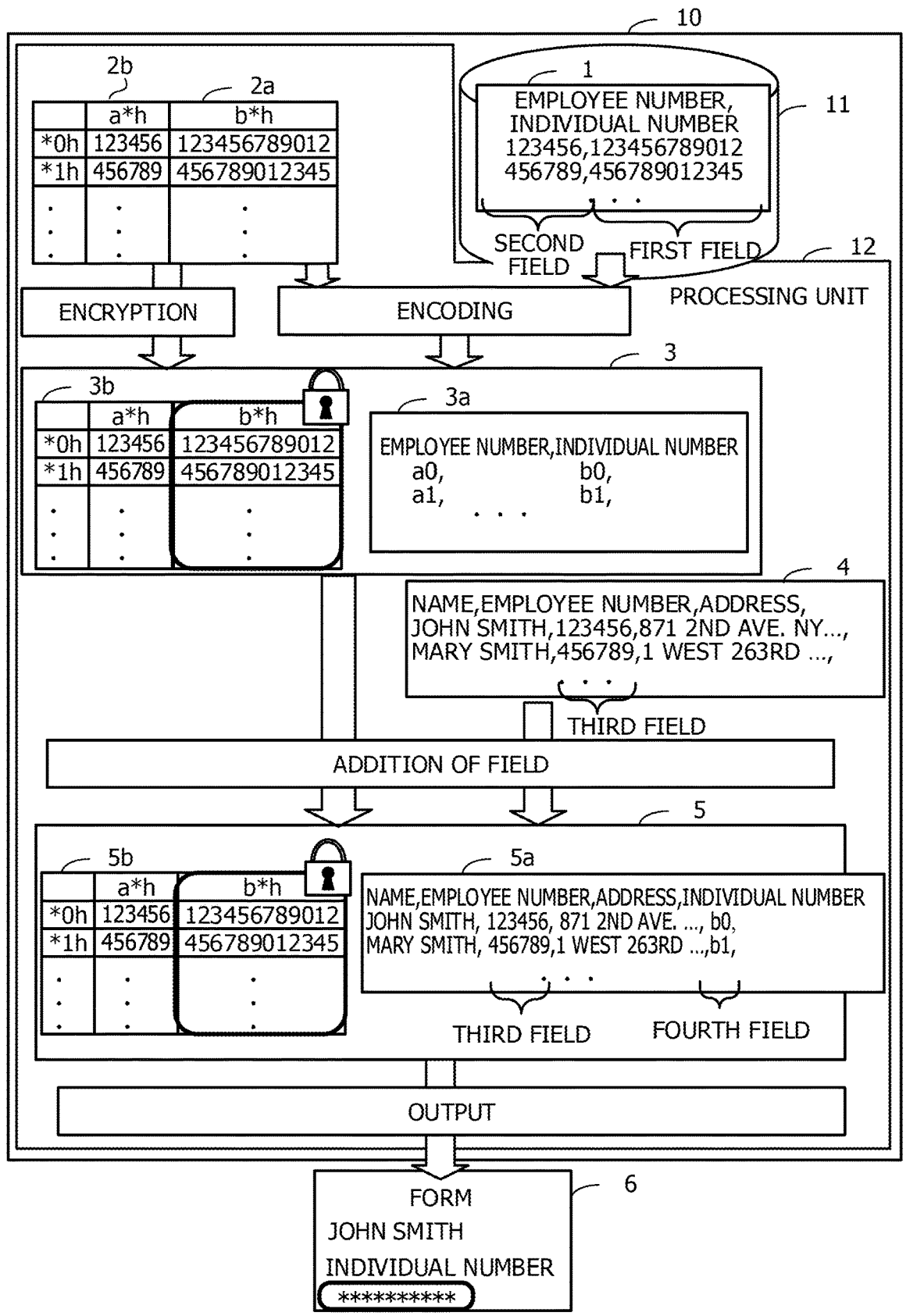
FIG. 1 illustrates an exemplary functional configuration of a data generating apparatus according to a first embodiment.

FIG. 1 illustrates an exemplary functional configuration of a data generating apparatus according to the first embodiment. Referring to FIG. 1, a data generating apparatus 10 includes a storage unit 11 and a processing unit 12.

The storage unit 11 stores a first file 1 including multiple records each including a first field and a second field. The first file 1 is a text-format file including first records each including the first field and the second field separated using, for example, a delimiter. The delimiter is a symbol or a special character that separates multiple elements from each other when the elements are listed. For example, commas separating fields are the delimiters in comma-separated values (CSV) format text data.

In each of the first records included in the first file 1, the data set in the first field is first data and the data set in the second field is second data. Highly confidential data is set as the first data. In the example in FIG. 1, the field having an attribute "Individual Number" is the first field and the field having an attribute "Employee number" is the second field. The Individual Number of each employee is the first data and the employee number of each employee is the second data.

The processing unit 12 acquires the first file 1 from the storage unit 11. Then, the processing unit 12 creates a first encoded dictionary 2a and encodes the first data (for example, the Individual Number) in the first record using the created first encoded dictionary 2a. The first encoded dictionary 2a indicates the correspondence between the first data and the codes. In the example in FIG. 1, the first encoded dictionary 2a indicates that the code corresponding to the Individual Number "123456789012" is "b0" and the code corresponding to the Individual Number "456789012345" is "b1".

In addition, the processing unit 12 creates a second encoded dictionary 2b and encodes the second data (for example, the employee number) in the first record using the second encoded dictionary 2b. The second encoded dictionary 2b indicates the correspondence between the second data and the codes. In the example in FIG. 1, the second encoded dictionary 2b indicates that the code corresponding to the employee number "123456" is "a0" and the code corresponding to the employee number "456789" is "a1".

The processing unit 12 creates an encoded file 3a in which the codes of the first data are associated with the codes of the second data. The created encoded file 3a is, for example, CSV format text data.

After creating the encoded file 3a, the processing unit 12 creates an encrypted dictionary 3b in which the first data in the first encoded dictionary 2a is encrypted. The second encoded dictionary 2b, which is not encrypted, may be included in the encrypted dictionary 3b. As a result, the highly confidential data, such as the Individual Number, is encrypted and held. The processing unit 12 combines the created encrypted dictionary 3b with the encoded file 3a to generate combined data 3. The combined data 3 is, for example, a CSV format text file. The combined data 3 is stored in, for example, a memory or a storage device in the data generating apparatus 10.

Then, the processing unit 12 acquires a second file 4 including other data in generation of the mixed information including the highly confidential first data, such as the Individual Number, and the other data. The second file 4 includes second records each including a third field in which data (for example, the employee number) of the same type as that of the second field is set. Multiple fields are included in each second record, in addition to the third field. In the example in FIG. 1, the fields of the name, the address, and so on of each employee are included in the second record.

The processing unit 12, which has acquired the second file 4, decodes the code of each of the second fields included in the multiple encoded records in the encoded file 3a based on the second encoded dictionary 2b. Then, the processing unit 12 adds a fourth field in which the code of the first field corresponding to decoded data resulting from the decoding is set to each second record in which the same data as the decoded data is set in the third field. As a result, a second file 5a to which the fourth fields are added is created. The second file 5a is, for example, a CSV format text file.

For example, the data set in the third field in the top second record of the second file 4 is "123456". The code associated with the data "123456" in the third field in the encoded file 3a is "b0". Accordingly, a record in which the code "b0" of the Individual Number is combined as the fourth field with the top record in the second file 4 is set in the second file 5a. The processing unit 12 may integrate the created second file 5a with an encrypted dictionary 5b in a third file 5. The third file 5 is, for example, a CSV format text file.

The processing unit 12 generates information in which the pieces of data in the second file 5a are combined with each other based on the third file 5 and outputs the generated information. For example, upon reception of an output request for a form 6 of a specific employee, the processing unit 12 extracts the record of the specified employee from the second file 5a. Then, the processing unit 12 creates a document including the data in the extracted record in accordance with the format of the form 6 and outputs the created document. Here, the highly confidential first data (for example, the Individual Number) itself is not included in the form 6 and only the code of the first data is included in the form 6. A user having an authority to refer to the Individual Number is capable of decoding the first data in the encrypted dictionary 5b to a plaintext. The decoding provides the first encoded dictionary 2a and the code of the Individual Number in the form 6 is capable of being returned to the original data using the first encoded dictionary 2a.

With the data generating apparatus 10 described above, the encrypted data is separated from general data other than the encrypted data for maintenance and, in the generation of the mixed information including the encrypted data and the general data, the mixed information is capable of being generated without decoding the encrypted data. As a result, it is possible to suppress a reduction in the security of the highly confidential data in the generation of the mixed information.

An advanced encryption technology is used to improve the security of the highly confidential data. The advanced encryption process is complicated and decoding of the encrypted data or re-encryption increases the processing load. In the first embodiment, the decoding of the encrypted data or the re-encryption is not performed in the generation of the mixed information, thus improving the processing efficiency.

The employee numbers set in the second field in the first file 1 are encoded in the first embodiment. Accordingly, the amount of data in the encoded file 3a is reduced.

In addition, since the highly confidential data is collected in the encrypted dictionary 5b in the first embodiment, it is easy to manage only the highly confidential data with a more secure server. For example, the data generating apparatus 10 is capable of holding the encrypted dictionary 3b and the second file 5a in different servers. For example, the data generating apparatus 10 may transmit the created encrypted dictionary 5b to a server (management server) which only the user having a high authority, such as a system manager, is capable of using and may cause the server to manage the encrypted dictionary 5b. The data generating apparatus 10 may transmit the second file 5a to a server (task server) used by a user who carries out a task, such as creation of forms, and may cause the server to manage the second file 5a. Here, the data generating apparatus 10 may be included in the management server or the task server. As described above, managing the encrypted dictionary 3b and the second file 5a in different servers enables the security of the highly confidential data to be improved.

The storage unit 11 may be realized by, for example, the memory or the storage device in the data generating apparatus 10. The processing unit 12 may be realized by, for example, a processor in the data generating apparatus 10.

Second Embodiment

A second embodiment will now be described. In the second embodiment, the personal information about employees is divided into highly confidential specific personal information, such as the Individual Number, and non-specific personal information other than the specific personal information and the specific personal information and the non-specific personal information are securely managed with a computer. The computer according to the second embodiment also encodes the non-specific personal information to reduce the amount of data.

Figure 2:
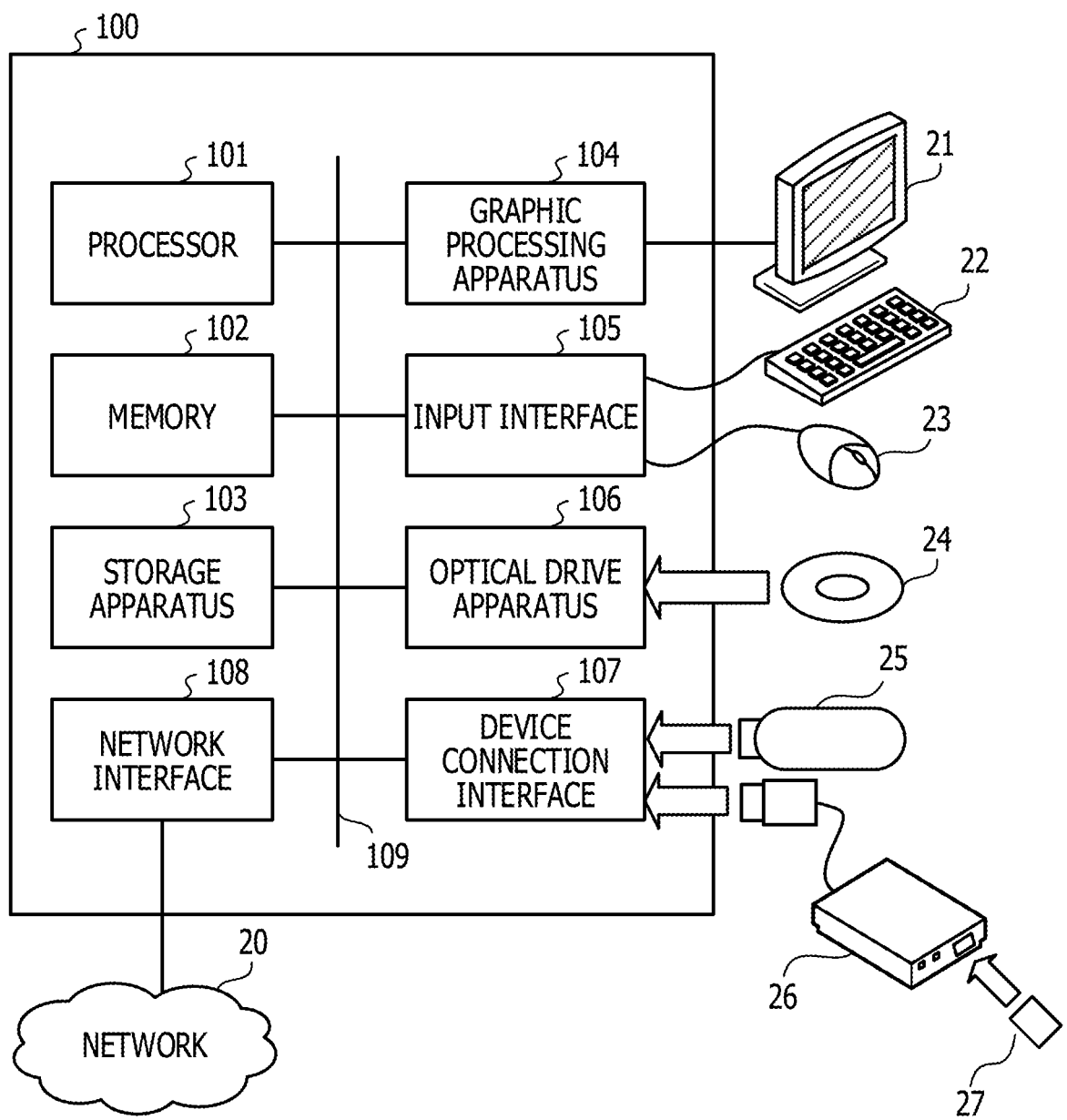
FIG. 2 is a block diagram illustrating an exemplary hardware configuration of a computer used in a second embodiment.

FIG. 2 is a block diagram illustrating an exemplary hardware configuration of a computer used in the second embodiment. Referring to FIG. 2, a processor 101 controls the entire computer 100. A memory 102 and multiple peripheral devices are connected to the processor 101 via a bus 109. The processor 101 may be a multiprocessor. The processor 101 is, for example, a central processing unit (CPU), a micro processing unit (MPU), or a digital signal processor (DSP). At least part of functions realized by the processor 101 that executes programs may be realized by an electronic circuit, such as an application specific integrated circuit (ASIC) or a programmable logic device (PLD).

The memory 102 is used as a main memory of the computer 100. At least part of programs in an operating system (OS) and application programs, which are executed by the processor 101, is temporarily stored in the memory 102. In addition, a variety of data used in the processing by the processor 101 is stored in the memory 102. For example, a volatile semiconductor device, such as a random access memory (RAM), is used as the memory 102.

The peripheral devices connected to the bus 109 include a storage device 103, a graphic processing unit 104, an input interface 105, an optical drive unit 106, a device connection interface 107, and a network interface 108.

The storage device 103 electrically or magnetically writes and reads data into and from a recording medium included in the storage device 103. The storage device 103 is used as an auxiliary memory of the computer 100. Programs in the OS, application programs, and a variety of data are stored in the storage device 103. For example, a hard disk drive (HDD) or a solid state drive (SSD) may be used as the storage device 103.

A monitor 21 is connected to the graphic processing unit 104. The graphic processing unit 104 displays an image on the screen of the monitor 21 in response to an instruction from the processor 101. For example, a display unit using a cathode ray tube (CRT) or a liquid crystal display unit is used as the monitor 21.

A keyboard 22 and a mouse 23 are connected to the input interface 105. A signal transmitted from the keyboard 22 or the mouse 23 is transmitted to the processor 101 via the input interface 105. The mouse 23 is an exemplary pointing device and another pointing device may be used. The other pointing device is, for example, a touch panel, a tablet, a touchpad, or a trackball.

The optical drive unit 106 reads data recorded on an optical disc 24 using laser light or the like. The optical disc 24 is a portable recording medium on which data is recorded so as to be read through reflection of light. The optical disc 24 is, for example, a digital versatile disc (DVD), a DVD-RAM, a compact disc read only memory (CD-ROM), or a compact disc recordable-rewritable (CD-R/RW).

The device connection interface 107 is a communication interface with which a peripheral device is connected to the computer 100. For example, a memory device 25 or a memory reader-writer 26 is capable of being connected to the device connection interface 107. The memory device 25 is a recording medium in which a communication function with the device connection interface 107 is installed. The memory reader-writer 26 is a unit that writes data on a memory card 27 or reads out data from the memory card 27. The memory card 27 is a card-type recording medium.

The network interface 108 is connected to a network 20. The network interface 108 transmits and receives data to and from another computer or a communication device over the network 20.

The processing functions of the second embodiment are capable of being realized with the hardware configuration described above. The data generating apparatus 10 described in the first embodiment is also capable of being realized with a hardware configuration similar to that of the computer 100 illustrated in FIG. 2.

The computer 100 executes programs recorded on, for example, a computer-readable recording medium to realize the processing functions of the second embodiment. The programs in which the content of processing to be performed by the computer 100 is described may be recorded in various recording media. For example, the programs to be executed by the computer 100 may be stored in the storage device 103. The processor 101 loads at least part of the programs in the storage device 103 onto the memory 102 to execute the programs. The programs to be executed by the computer 100 may be recorded on a portable recording medium, such as the optical disc 24, the memory device 25, or the memory card 27. The programs stored on the portable recording medium are installed in the storage device 103, for example, under the control of the processor 101 for execution. The processor 101 may directly read out the programs from the portable recording medium to execute the programs.

A form management function in the computer 100 will now be described.

Figure 3:
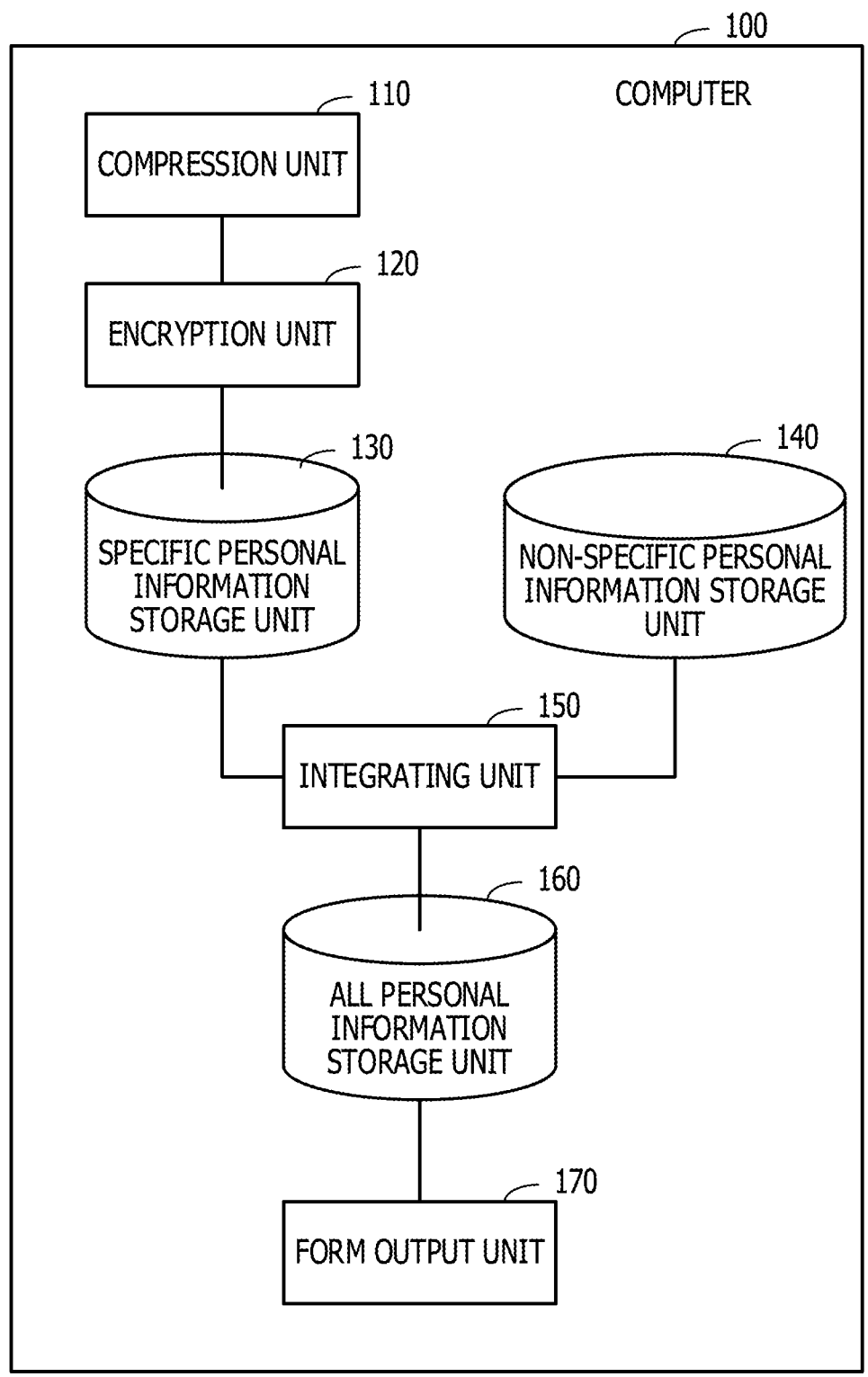
FIG. 3 is a block diagram illustrating an example of a form management function of the computer.

FIG. 3 is a block diagram illustrating an example of the form management function of the computer. The computer 100 includes a compression unit 110, an encryption unit 120, a specific personal information storage unit 130, a non-specific personal information storage unit 140, an integrating unit 150, an all personal information storage unit 160, and a form output unit 170.

The compression unit 110 associates the Individual Number, which is the specific personal information, with an identifier used to identify a person corresponding to the Individual Number in a system. The compression unit 110 compresses a file in which the correspondence between the Individual Number and the identifier is set. This file is hereinafter referred to as a specific personal information file. The specific personal information file is, for example, a CSV format text file. The identifier used to identify a person in a system is, for example, the employee number of the person corresponding to the Individual Number.

For example, the compression unit 110 encodes the employee number and the Individual Number into the codes having data lengths shorter than the lengths of the original employee number and Individual Number to compress the specific personal information file. The file that has been compressed is hereinafter referred to as a compressed file. An encoded dictionary indicating the correspondence between the employee number or the Individual Number before the encoding and the code after the encoding is included in the compressed file.

The encryption unit 120 encrypts the portion of the Individual Numbers, which is not encoded, in the compressed file. For example, the encryption unit 120 encrypts the Individual Numbers registered in the encoded dictionary in association with the codes. The encryption unit 120 stores a file in which the portion of the Individual Numbers is encrypted in the specific personal information storage unit 130. The file in which the portion of the Individual Numbers is encrypted is hereinafter referred to as a partially encrypted file.

The specific personal information storage unit 130 stores the partially encrypted file including the Individual Numbers. For example, part of the storage area of the memory 102 or the storage device 103 is used as the specific personal information storage unit 130.

The non-specific personal information storage unit 140 stores a file in which the non-specific personal information, which is the personal information other than the specific personal information, such as the Individual Number, is set. The file in which the non-specific personal information is set is hereinafter referred to as a non-specific personal information file. For example, part of the storage area of the memory 102 or the storage device 103 is used as the non-specific personal information storage unit 140.

The integrating unit 150 integrates the non-specific personal information file with the partially encrypted file to create one file. The integrated file is hereinafter referred to as an all personal information file. The integrating unit 150 compresses the information in the non-specific personal information file in the integration. The integrating unit 150 stores the all personal information file in the all personal information storage unit 160.

The all personal information storage unit 160 stores the all personal information file integrated by the integrating unit 150. For example, part of the storage area of the memory 102 or the storage device 103 is used as the all personal information storage unit 160.

The form output unit 170 creates a form based on the all personal information file stored in the all personal information storage unit 160 and outputs the created form.

With the computer 100 having the above functions, the all personal information file including both the Individual Numbers and the non-specific personal information is capable of being created without decoding the encrypted Individual Numbers. Extraction of the personal information about a specific employee from the all personal information file enables the form of the employee to be created. In other words, the form of an arbitrary employee is capable of being created without decoding the Individual Number that is encrypted and that is managed separately from the non-specific personal information.

Lines that make a connection between the components in FIG. 3 indicate part of a communication path and a communication path other than the communication path illustrated in FIG. 3 is capable of being set. The function of each component illustrated in FIG. 3 is capable of being realized by the computer that executes a program module corresponding to the component.

A process of creating a form will now be described.

Figure 4:
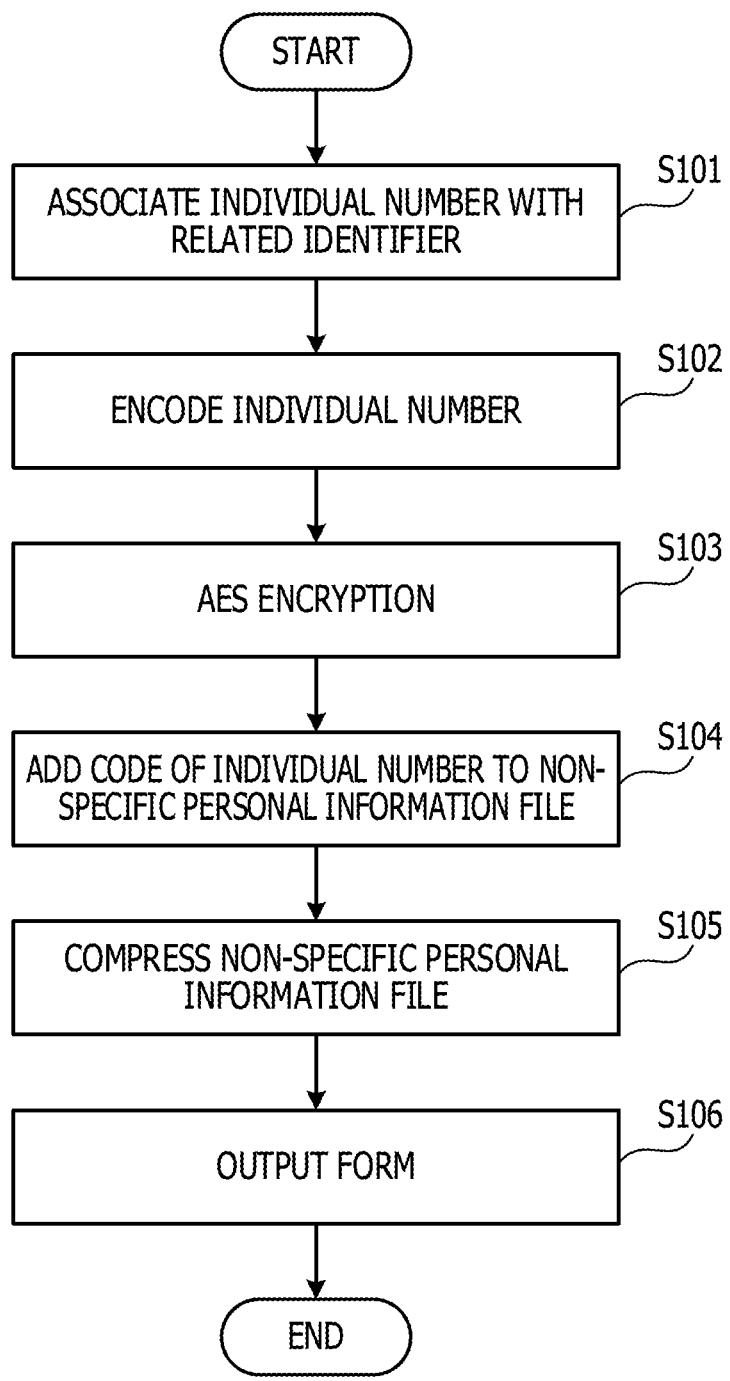
FIG. 4 is a flowchart illustrating an exemplary process of creating a form.

FIG. 4 is a flowchart illustrating an exemplary process of creating a form. The process illustrated in FIG. 4 will be described according to step numbers.

[Step S101]

Upon input of the specific personal information file, the compression unit 110 associates the Individual Number with the identifier (for example, the employee number) of the person corresponding to the Individual Number. For example, the compression unit 110 accepts input of the Individual Number corresponding to the employee number and associates the input Individual Number with the employee number. Then, the compression unit 110 creates the specific personal information file in which a pair of the Individual Number and the employee number that are associated with each other is set.

[Step S102]

The compression unit 110 encodes the Individual Number indicated in the specific personal information file. The compression unit 110 may encode both the Individual Number and the employee number. For example, the compression unit 110 creates the encoded dictionary indicating the correspondence between numerical values representing the Individual Number and/or the employee number and the codes. The compression unit 110 converts the Individual Number and the employee number into the codes based on the encoded dictionary. The compression unit 110 creates the compressed file including the codes of the Individual Number and the employee number and the encrypted dictionary.

[Step S103]

The encryption unit 120 encrypts the information indicating the Individual Numbers in the compressed file according to Advanced Encryption Standard (AES). For example, the encryption unit 120 encrypts the Individual Numbers that are set in association with the codes in the encoded dictionary. Then, the encryption unit 120 stores the encryption file resulting from encryption of part of the compressed file in the specific personal information storage unit 130.

[Step S104]

The integrating unit 150 extracts the non-specific personal information file from the non-specific personal information storage unit 140 and adds the codes of the Individual Numbers to the non-specific personal information file. For example, the integrating unit 150 sets the code of the Individual Number corresponding to the employee number in association with the employee number included in the non-specific personal information file.

[Step S105]

The integrating unit 150 compresses the non-specific personal information file. For example, the integrating unit 150 encodes the portion of the non-specific personal information in the non-specific personal information file. Then, the integrating unit 150 creates the compressed all personal information file. Here, the integrating unit 150 adds the correspondence between the non-specific personal information and the code to the encoded dictionary in the specific personal information file and adds the encoded dictionary to the all personal information file. The integrating unit 150 stores the created all personal information file in the all personal information storage unit 160.

[Step S106]

The form output unit 170 refers to the personal information in the all personal information file in response to an input from the user to output a form. For example, the form output unit 170 extracts the personal information about an employee specified by the user from the all personal information file and decodes the personal information using the encoded dictionary. Then, the form output unit 170 creates a form file of a certain format, which includes the decoded personal information, and outputs the form file. Here, when the user has an authority to refer to the Individual Number, the form output unit 170 may decode the encrypted Individual Number into a plaintext and may include the plaintext in the form file.

The form is created in the above manner. Examples of how the form is created will now be specifically described with reference to FIG. 5 to FIG. 8.

Figure 5:
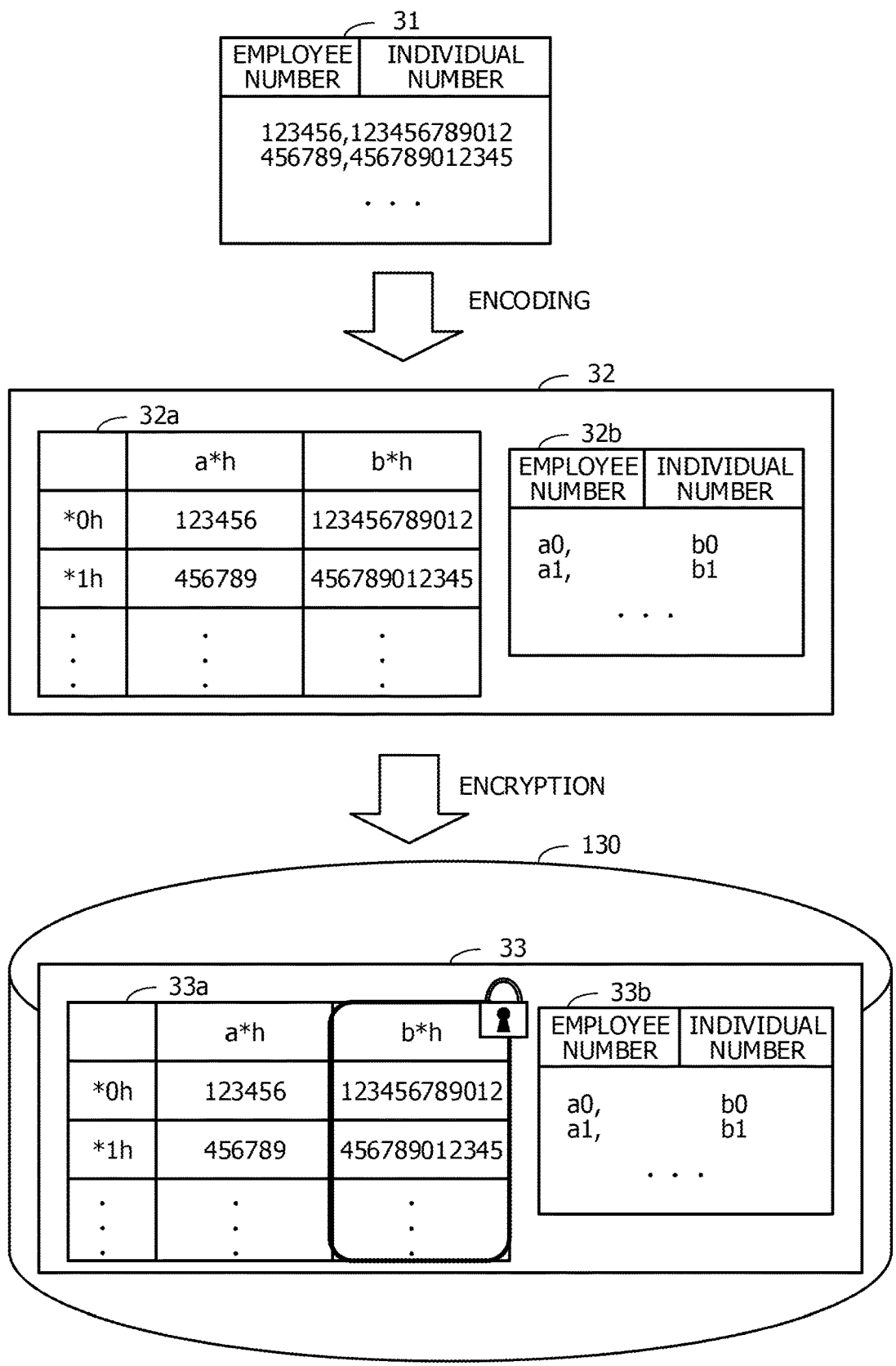
FIG. 5 illustrates an example of how Individual Numbers are encrypted and held.

FIG. 5 illustrates an example of how the Individual Numbers are encrypted and held. First, the compression unit 110 creates a specific personal information file 31 in which each employee number is associated with the corresponding Individual Number. For example, the specific personal information file 31 is, for example, a CSV format text file including the employee number and the Individual Number as the fields. The specific personal information file 31 is compressed by the compression unit 110 to create a compressed file 32.

An encoded dictionary 32a and an encoded file 32b are included in the compressed file 32. The correspondence between each employee number or each Individual Number and the code is indicated in the encoded dictionary 32a. In the example in FIG. 5, the values of the upper four bits of one-byte code are the label of a column of the encoded dictionary 32a and the values of the lower four bits are the label of a row of the encoded dictionary 32a. A pair of the label of the column and the label of the row at a position in which the employee number or the Individual Number is set in the encoded dictionary 32a indicates the code of the employee number or the Individual Number. For example, the code corresponding to the employee number "123456" is "a0". The code corresponding to the Individual Number "123456789012" is "b0". Records including the codes of the employee numbers and the Individual Numbers are set in the encoded file 32b in, for example, the CVS format.

The compressed file 32 is passed to the encryption unit 120. A partially encrypted file 33 resulting from encryption of the portion of the Individual Numbers is created by the encryption unit 120. Only an area where the Individual Numbers are set is encrypted in an encrypted dictionary 33a in the partially encrypted file 33. For example, the encryption unit 120 collectively stores multiple Individual Numbers in a buffer and encrypts information in the buffer. An encoded file 33b in the partially encrypted file 33 is the same as the encoded file 32b in the compressed file 32.

The partially encrypted file 33 is stored in the specific personal information storage unit 130. Accordingly, the especially highly confidential Individual Numbers are managed separately from the non-specific personal information. The encrypted dictionary 33a in the partially encrypted file 33 is an example of the combined data 3 (refer to FIG. 1) in the first embodiment.

Figure 6:
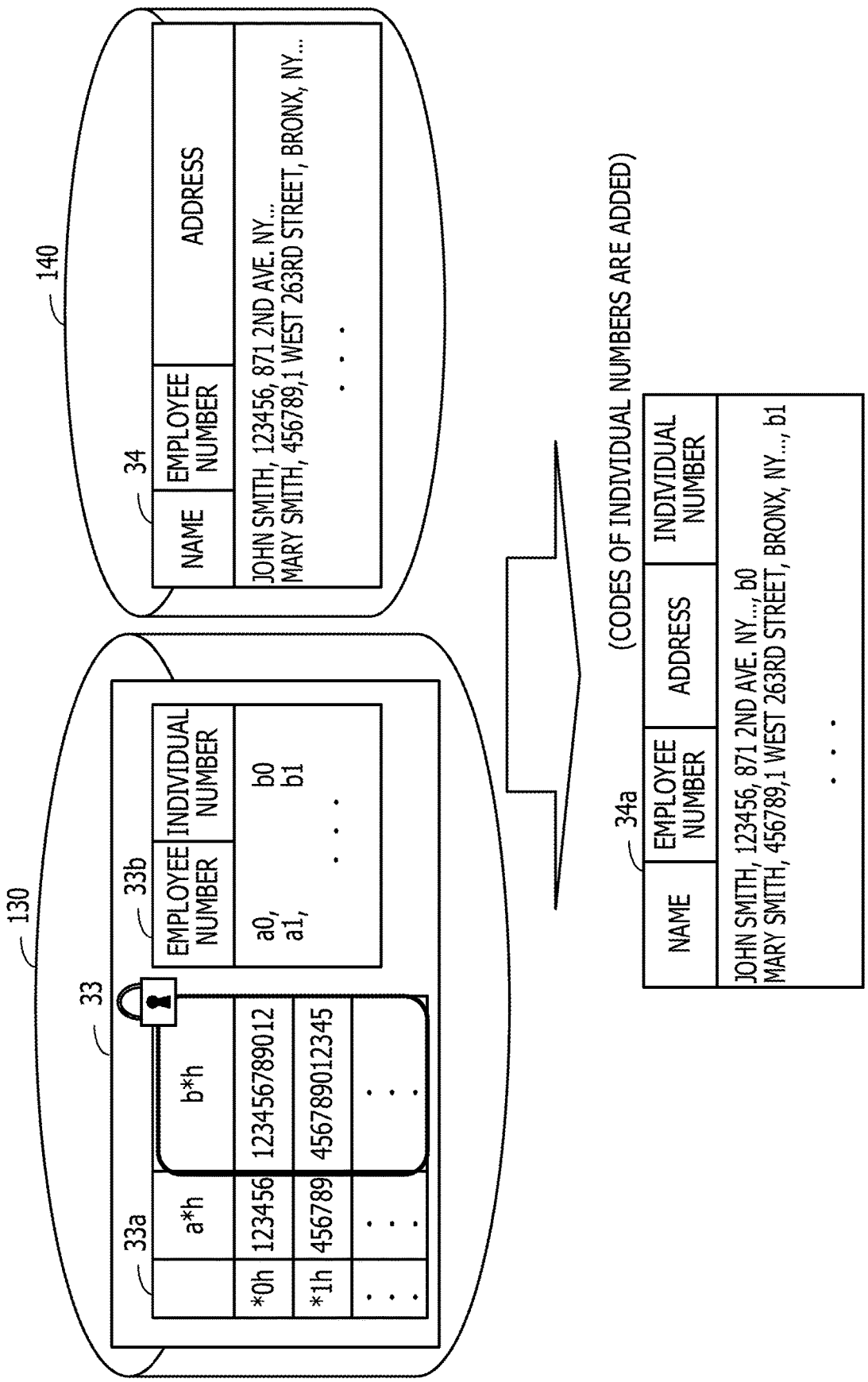
FIG. 6 illustrates an example of how codes of the Individual Numbers are added to a non-specific personal information file.

FIG. 6 illustrates an example of how the codes of the Individual Numbers are added to the non-specific personal information file. The integrating unit 150 associates the code of the Individual Number in the partially encrypted file 33 with the record of a specific person in a non-specific personal information file 34 using the employee number. The integrating unit 150 adds the code of the Individual Number corresponding to the employee number of the person indicated in the record to the record in the non-specific personal information file 34.

For example, the integrating unit 150 selects the records from the non-specific personal information file 34 one by one. Then, the integrating unit 150 acquires the code corresponding to the employee number in the selected record from the encrypted dictionary 33a. The integrating unit 150 acquires the code of the Individual Number associated with the acquired code of the employee number from the encoded file 33b. The integrating unit 150 adds the acquired code of the Individual Number as the Individual Number of the selected record.

For example, when the integrating unit 150 selects the record of the employee number "123456", the code "a0" of the employee number is extracted from the encrypted dictionary 33a. Next, the code "b0" of the Individual Number associated with the code "a0" of the employee number is extracted from the encoded file 33b. Then, the code "b0" of the Individual Number is added to the record of the employee number "123456" in the non-specific personal information file 34.

The process of adding the code of the Individual Number described above is performed for all the records in the non-specific personal information file 34. As a result, a non-specific personal information file 34a to which the encoded Individual Numbers are added is created. Then, information that is not encoded in the non-specific personal information file 34a to which the encoded Individual Numbers are added is encoded. This creates the all personal information file the amount of data of which is compressed.

Figure 7:
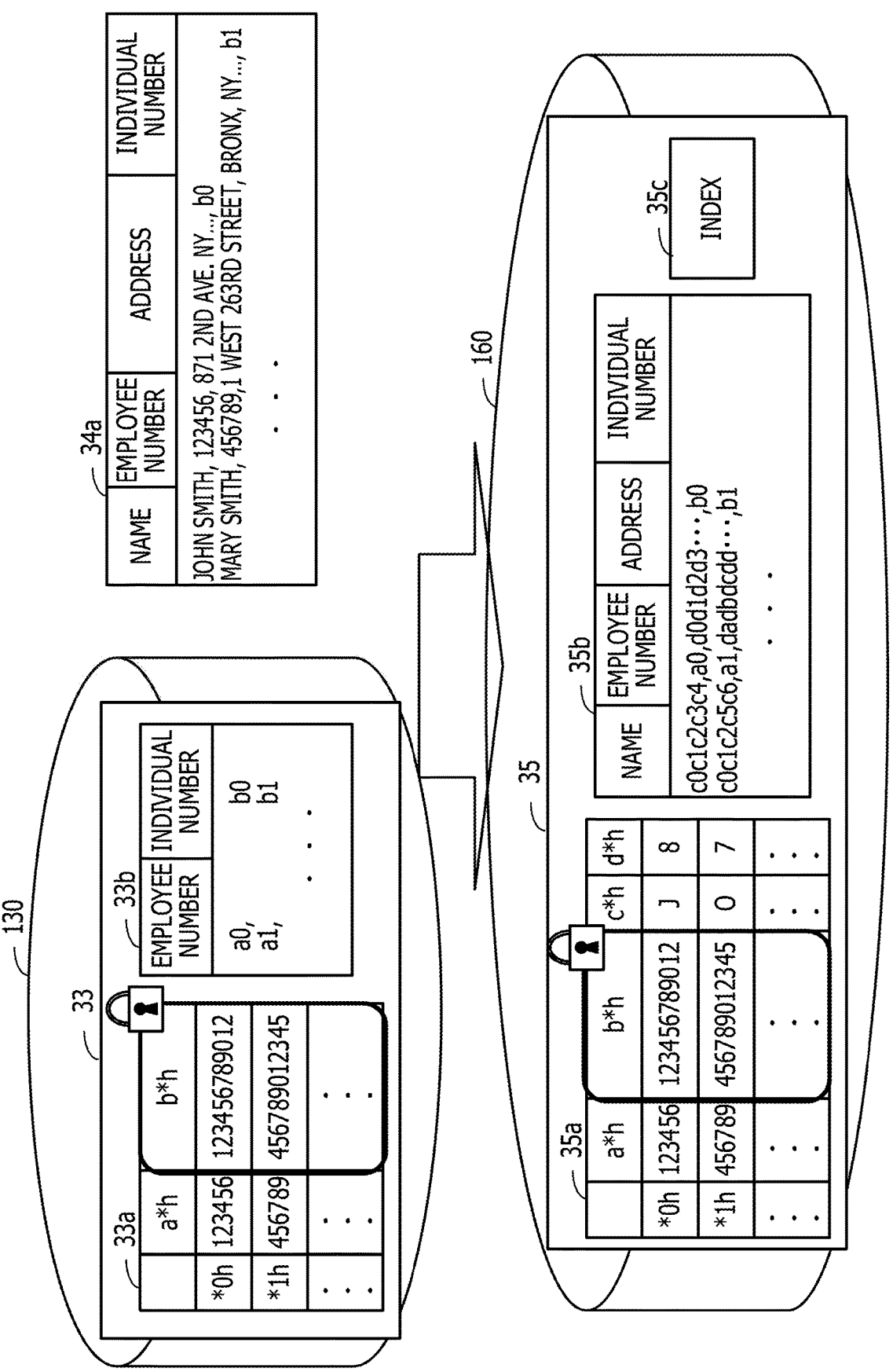
FIG. 7 illustrates an example of how an all personal information file is created.

FIG. 7 illustrates an example of how the all personal information file is created. The integrating unit 150 determines the code corresponding to a character or a numerical value included in each record in the non-specific personal information file 34a and adds the determined code to the encrypted dictionary 33a in the partially encrypted file 33. As a result, an encrypted dictionary 35a including the correspondence between each piece of non-specific personal information and the code is created. The integrating unit 150 converts the character or the numerical value in the non-specific personal information file 34a into the code based on the created encrypted dictionary 35a to create an encoded file 35b corresponding to the non-specific personal information file 34a.

In the creation of the encoded file 35b, the integrating unit 150 may create an index 35c used for search for the specific personal information or the non-specific personal information. For example, the position at which each character included in the non-specific personal information file 34a appears in the non-specific personal information file 34a is indicated in the index 35c. The integrating unit 150 may set the presence of an authority to search for each field in the encoded file 35b to each user in the creation of the index 35c. When the search authority for each user is set, the form output unit 170 extracts only information about the fields for which the user, who has input a request to output a form, has the search authority from the encoded file 35b and decodes the information.

In addition, the integrating unit 150 creates an all personal information file 35 in which the encrypted dictionary 35a, the encoded file 35b, and the index 35c, that are created, are integrated and stores the created all personal information file 35 in the all personal information storage unit 160. The form output unit 170 creates a form of a format specified by the user based on the all personal information file 35 in the all personal information storage unit 160 and outputs the created form.

As described above, in the second embodiment, the computer 100 associates the field to be associated with the Individual Number with the encoded Individual Number to create the encoded dictionary 32a. In addition, the computer 100 creates the encrypted dictionary 33a in which the Individual Numbers are encrypted and combines the encoded Individual Numbers with the non-specific personal information other than the Individual Numbers. This enables the combining process at high speed while keeping the data size small through the compression and meeting the secure condition of the form through the encryption. In particular, by compressing long data length characters such as Kanji, the effect of reducing the data size can be further enhanced.

In the case of an application using only part of the records in the all personal information file 35, the part of the records may be extracted from the encoded file 35b in the all personal information file 35 to create another file. Creating the file including only part of the records and holding the created file in the above manner enable the search time of the records in the creation of a form for a specific application to be reduced to perform the processing with high efficiency.

Although the employee numbers are encoded in the partially encrypted file 33 in the example illustrated in FIG. 5, the employee numbers may not be encoded.

Figure 8:
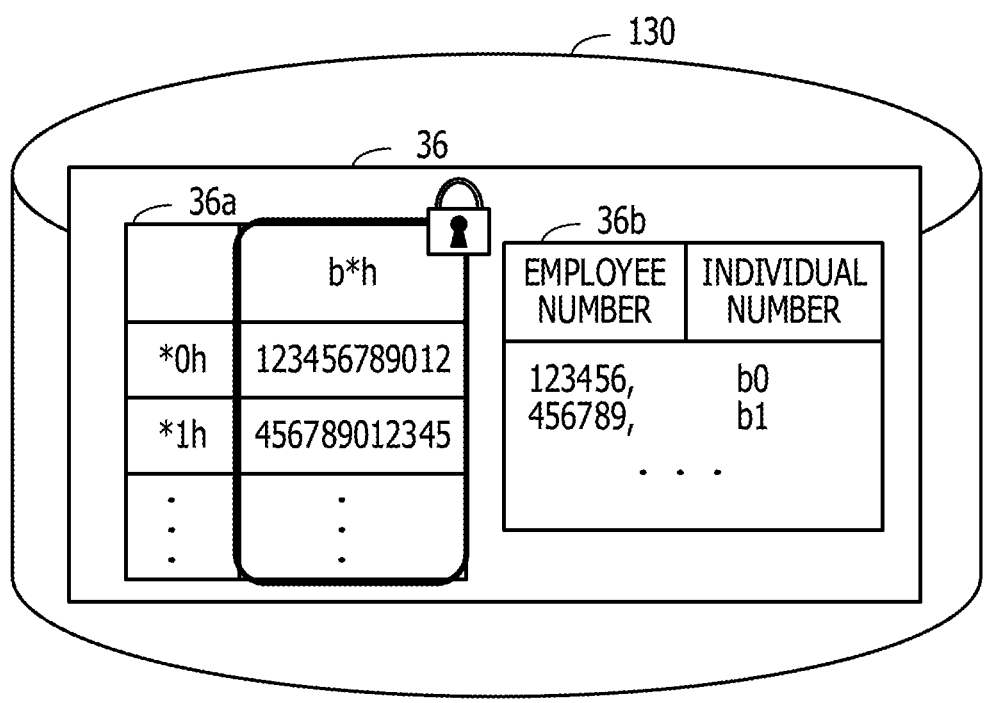
FIG. 8 illustrates an example of a partially encrypted file in which employee numbers are not encoded.

FIG. 8 illustrates an example of the partially encrypted file in which the employee numbers are not encoded. An encrypted dictionary 36a and an encoded file 36b, illustrated in FIG. 8, are included in a partially encrypted file 36 in which the employee numbers are not encoded. The correspondence between each Individual Number and the code of the Individual Number is indicated in the encrypted dictionary 36a. The Individual Numbers are encrypted in the encrypted dictionary 36a. The correspondence between each employee number and the code of the corresponding Individual Number is set in the encoded file 36b.

Third Embodiment

A third embodiment will now be described. In the third embodiment, the all personal information file 35 created by the computer 100 of the second embodiment is distributed between multiple servers for management. For example, in the third embodiment, the specific personal information is not included in the data of the server that manages the form and the server integrates the specific personal information in secondary use (for example, printing or search).

Figure 9:
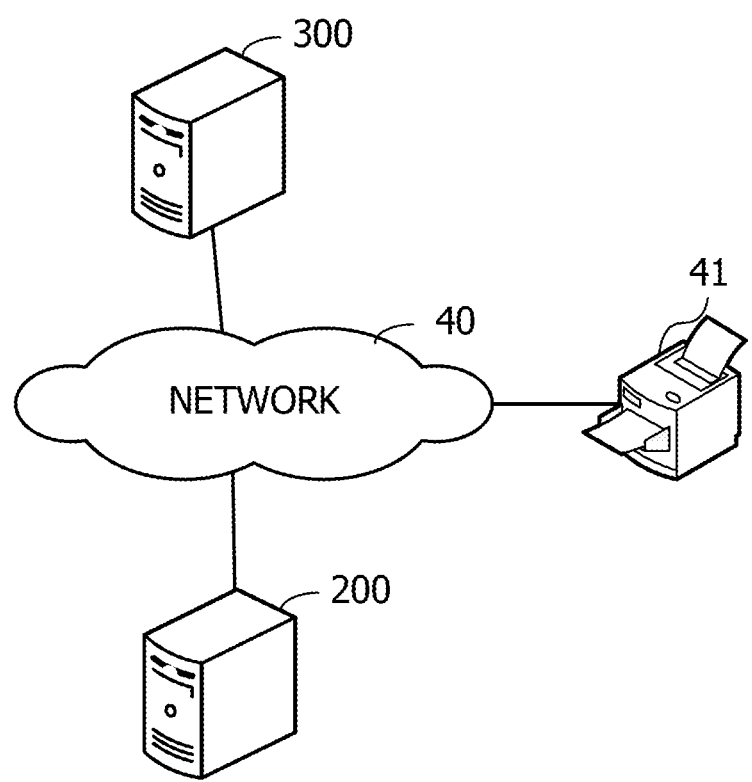
FIG. 9 illustrates an exemplary configuration of a system of a third embodiment.

FIG. 9 illustrates an exemplary configuration of a system of the third embodiment. In the third embodiment, a form management server 200 is connected to an Individual Number management server 300 over a network 40. A printer 41 is connected to the network 40.

The form management server 200 combines the non-specific personal information with the Individual Number, which is the specific personal information, in response to a request from the user to create a form. For example, the form management server 200 holds the non-specific personal information and acquires the Individual Number from the Individual Number management server 300 in response to a request from the user. The form management server 200 creates a form in which the non-specific personal information is combined with the Individual Number and transmits a request to print the form to the printer 41. After the form is printed by the printer 41, the form management server 200 deletes the created form.

The Individual Number management server 300 encrypts the Individual Number of each person for management. For example, the Individual Number management server 300 holds the Individual Number of an employee with being encrypted in association with the employee number of the employee.

The form management server 200 and the Individual Number management server 300 are capable of being realized with a hardware configuration similar to the hardware configuration of the computer 100 illustrated in FIG. 2.

Figure 10:
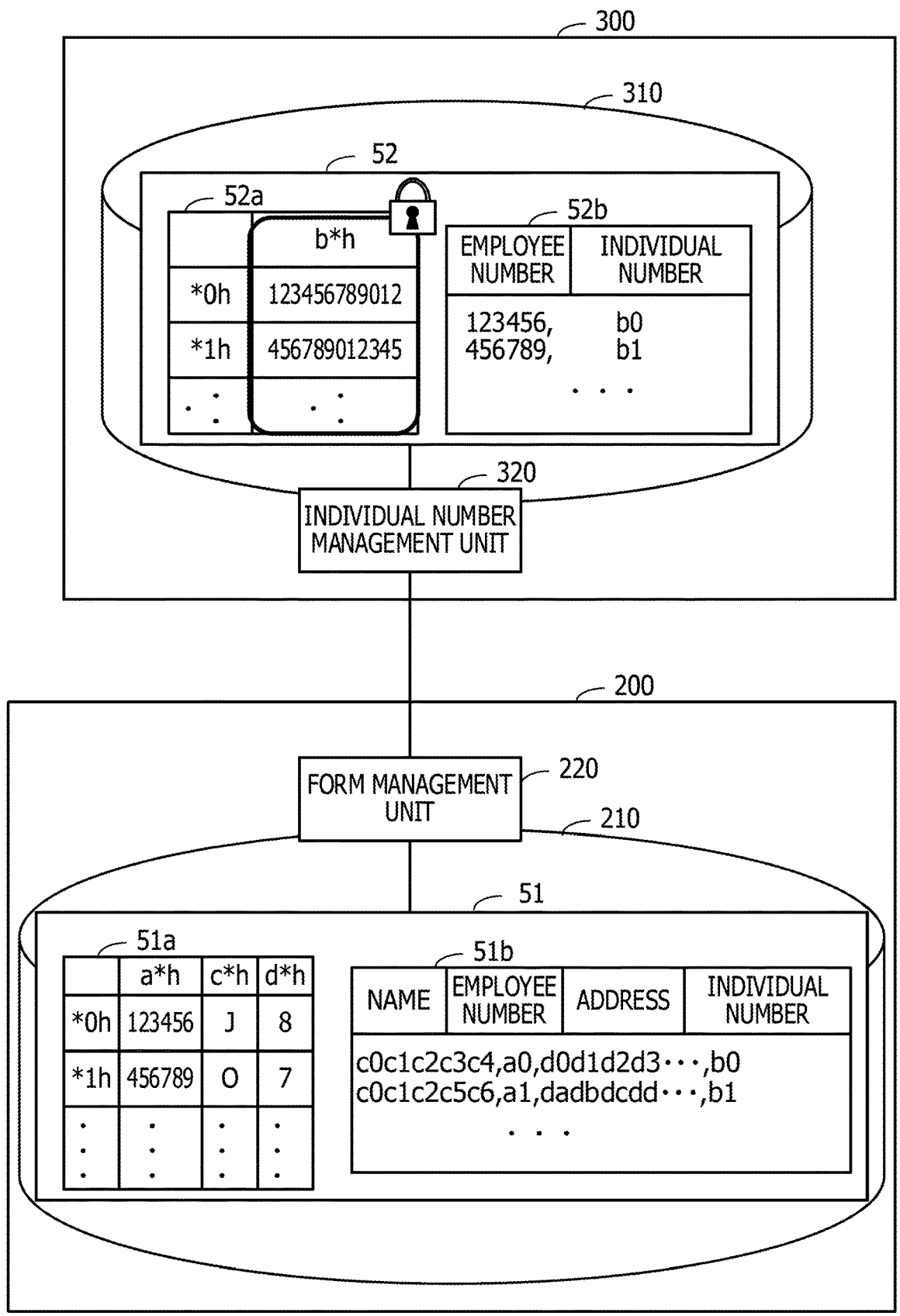
FIG. 10 is a block diagram illustrating functions of the third embodiment.

FIG. 10 is a block diagram illustrating the functions of the third embodiment. The form management server 200 includes a non-specific personal information storage unit 210 and a form management unit 220.

The non-specific personal information storage unit 210 stores a non-specific personal information file 51. An encoded dictionary 51a and an encoded file 51b are included in the non-specific personal information file 51. The correspondence between a character or a numerical value included in the non-specific personal information and the code is indicated in the encoded dictionary 51a. The encoded file 51b is an array of codes resulting from encoding of the non-specific personal information. For example, the codes of, for example, each name, the corresponding employee number, the corresponding address, and the corresponding Individual Number are included in the encoded file 51b.

The encoded dictionary 51a in the non-specific personal information file 51 results from deletion of the portion relating to the Individual Numbers from the encrypted dictionary 35a (refer to FIG. 7) in the all personal information file 35 in the second embodiment. The encoded file 51b is the same as the encoded file 35b (refer to FIG. 7) in the all personal information file 35 in the second embodiment. Accordingly, the non-specific personal information file 51 is capable of being created by deleting the portion of the Individual Numbers in the encrypted dictionary 35a from the all personal information file 35 created by the computer 100 of the second embodiment.

The form management server 200 may have the function to create the non-specific personal information file 51 or the Individual Number management server 300 may have the function to create the non-specific personal information file 51. The server having the function to create the non-specific personal information file 51 has a function to delete the portion of the Individual Numbers in the encrypted dictionary 35a from the all personal information file 35, in addition to the functions of the computer 100 of the second embodiment, illustrated in FIG. 3.

The form management unit 220 creates a form in response to a request to create a form from the user. For example, upon reception of the request to create a form, in which an employee number is specified, the form management unit 220 transmits an Individual Number request including the employee number to the Individual Number management server 300. The form management unit 220 receives a response including information concerning the Individual Number corresponding to the specified employee number from the Individual Number management server 300. When the encrypted Individual Number is included in the response, the form management unit 220 decodes the Individual Number. The form management unit 220 creates a form in which the acquired Individual Number is combined with the non-specific personal information and transmits a request to print the form to the printer 41. Then, the form management unit 220 deletes the created form.

The Individual Number management server 300 includes a specific personal information storage unit 310 and an Individual Number management unit 320.

The specific personal information storage unit 310 stores a partially encrypted file 52. An encrypted dictionary 52a and an encoded file 52b are included in the partially encrypted file 52. The correspondence between each Individual Number and the code of the Individual Number is indicated in the encrypted dictionary 52a. The information about the Individual Numbers in the encrypted dictionary 52a is, for example, numbered. The correspondence between each employee number and the code of the Individual Number corresponding to the employee number is indicated in the encoded file 52b.

The partially encrypted file 52 is the same as the partially encrypted file 36 in the second embodiment, illustrated in FIG. 8, and is capable of being created using the computer 100 illustrated in the second embodiment.

In response to the Individual Number request from the form management server 200, the Individual Number management unit 320 extracts information about the Individual Number corresponding to the employee number specified in the Individual Number request. For example, the Individual Number management unit 320 refers to the encoded file 52b to acquire the code of the Individual Number corresponding to the specified employee number. The Individual Number management unit 320 transmits a response including the acquired code and the encrypted dictionary 52a to the form management server 200.

Figure 11:
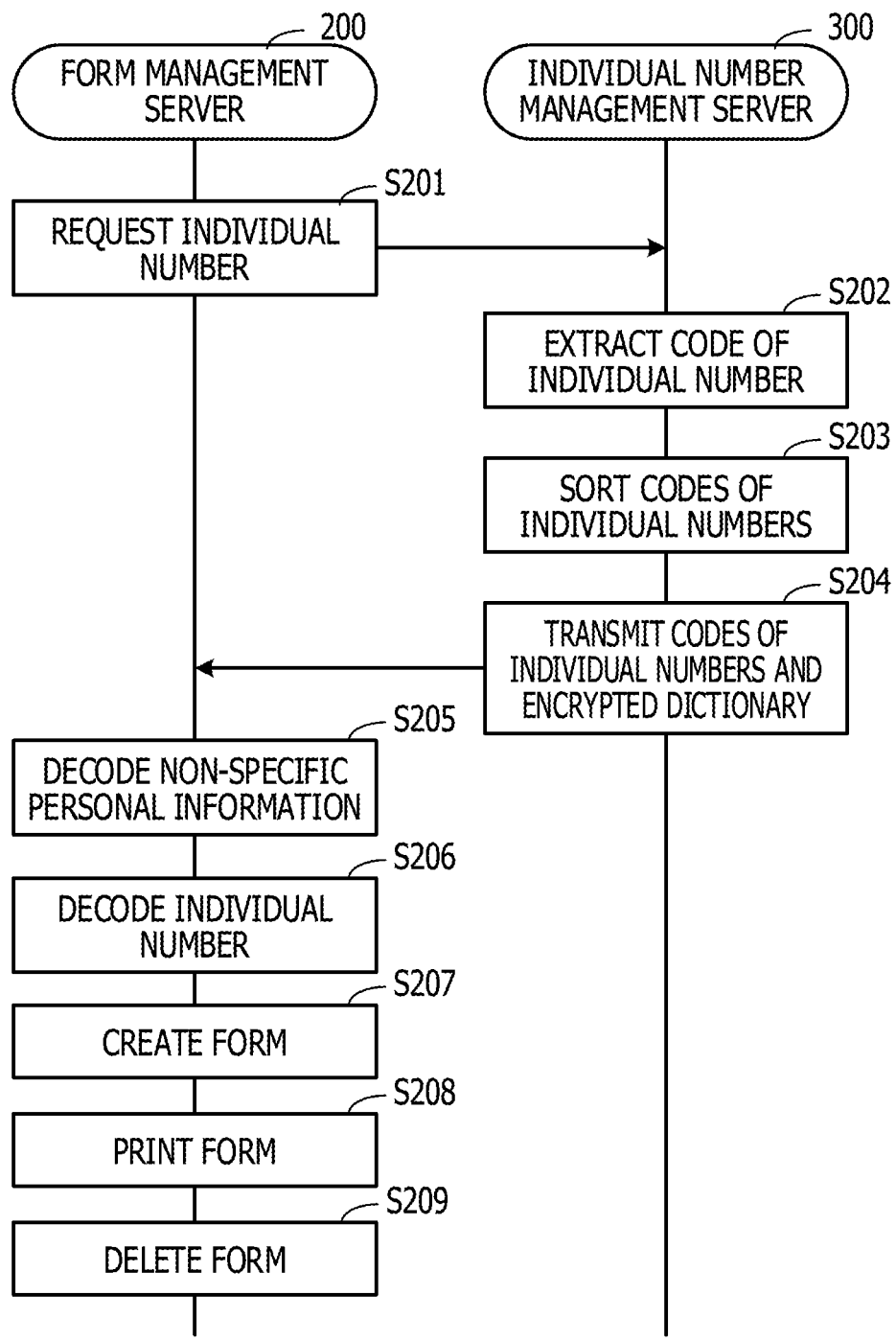
FIG. 11 is a sequence diagram illustrating an exemplary process of printing a form in the third embodiment.

FIG. 11 is a sequence diagram illustrating an exemplary process of printing a form in the third embodiment. Referring to FIG. 11, in Step S201, upon reception of a request to create a form, the form management server 200 transmits the Individual Number request to the Individual Number management server 300. In Step S202, the Individual Number management server 300 extracts the code of the Individual Number corresponding to the employee number indicated in the Individual Number request from the encoded file 52b. In Step S203, the Individual Number management server 300 sorts the extracted codes of the Individual Numbers in the order of the employee numbers indicated in the Individual Number request. In Step S204, the Individual Number management server 300 transmits a response including the codes of the Individual Numbers and the encrypted dictionary 52a for the Individual Numbers to the form management server 200.

In Step S205, the form management server 200 decodes the non-specific personal information that is held with being encoded. In Step S206, the form management server 200 decodes the Individual Number based on the response from the Individual Number management server 300. In Step S207, the form management server 200 combines the non-specific personal information with the Individual Number to create a form. In Step S208, the form management server 200 transmits a request to print the created form to the printer 41 to print the form. In Step S209, the form management server 200 deletes the created form from the memory. Then, the process illustrated in FIG. 11 is terminated.

The form is printed according to the above process.

Figure 12:
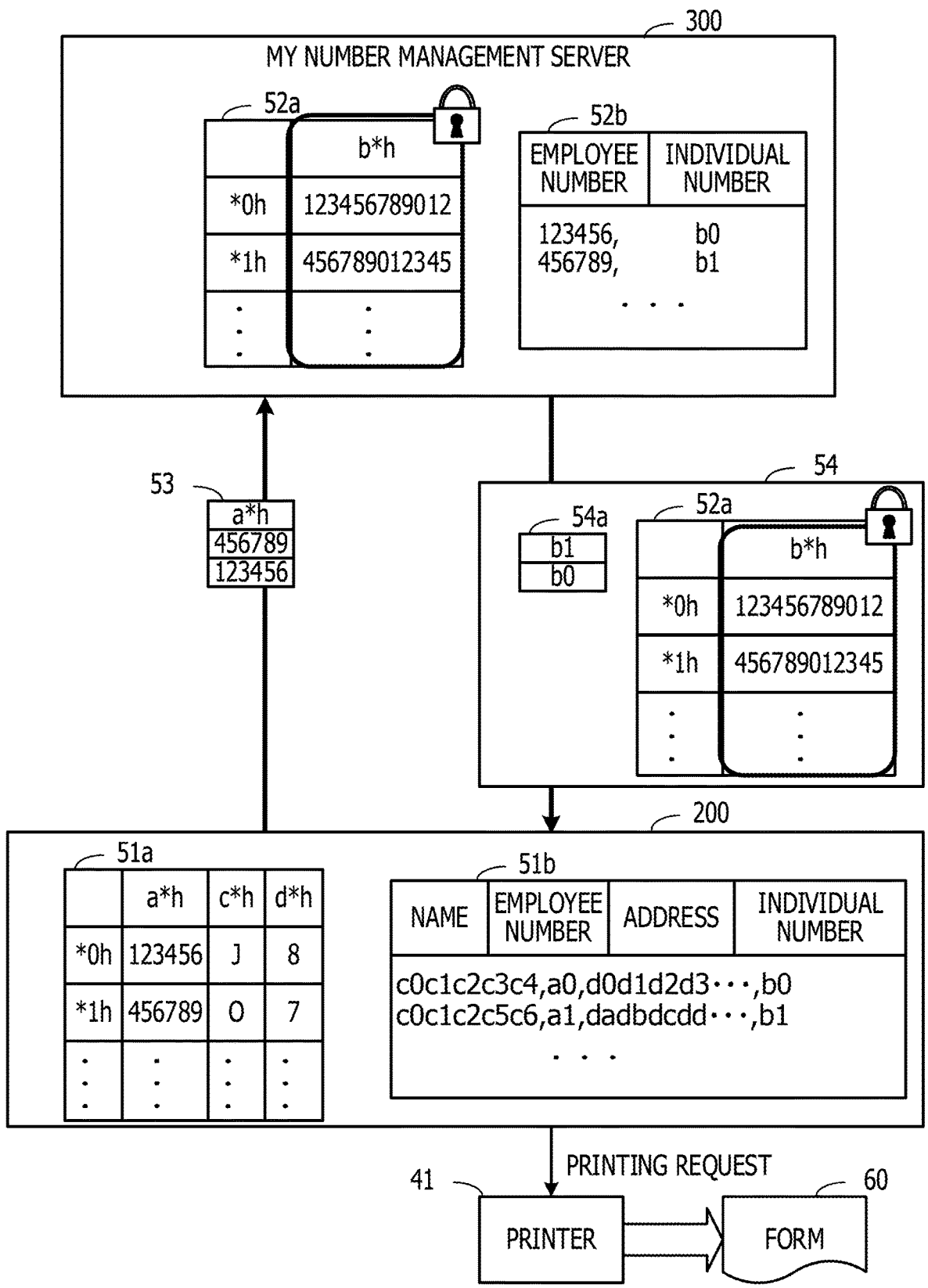
FIG. 12 illustrates a specific example of the process of printing a form.

FIG. 12 illustrates a specific example of the process of printing a form. In the example in FIG. 12, the form management server 200 transmits an Individual Number request 53 including the employee numbers "456789" and "123456" to the Individual Number management server 300.

The Individual Number management server 300 refers to the encoded file 52b to acquire the codes "b0" and "b1" of the Individual Numbers corresponding to the employee numbers included in the Individual Number request 53. Then, the Individual Number management server 300 sorts the acquired codes "b0" and "b1" in the order of the employee numbers "456789" and "123456" in the Individual Number request 53. In other words, the Individual Number management server 300 rearranges the codes so that the code "b1" corresponding to the employee number "456789" is followed by the code "b0" corresponding to the employee number "123456". The Individual Number management server 300 transmits a response 54 including a code group 54a after the sorting and the encrypted dictionary 52a to the form management server 200.

The form management server 200 decodes the Individual Number corresponding to each code indicated in the code group 54a using the encrypted dictionary 52a for the Individual Numbers. For example, the form management server 200 has a key used for decoding the Individual Numbers and decodes information about the Individual Numbers in the encrypted dictionary 52a into plaintexts using the key. Then, the form management server 200 extracts the Individual Numbers corresponding to the code group 54a from the encrypted dictionary 52a after the decoding.

In addition, the form management server 200 decodes the characters or the numerical values included in the records corresponding to the employee numbers "456789" and "123456" in the encoded file 51b using the encoded dictionary 51a. The form management server 200 creates a form including the non-specific personal information and the Individual Number and transmits a request to print the form to the printer 41. A form 60 is printed by the printer 41.

FIG. 13 illustrates an example of a form to be printed. A printed example of the form 60 indicating a withholding certificate of employment income is illustrated in FIG. 13. The names, the address, the Individual Numbers, and so on of an employee and the family of the employee are included in the form 60.

After printing the form 60, the data in the form 60 is deleted from the memory in the form management server 200. The code group 54a and the encrypted dictionary 52a, which have been received from the Individual Number management server 300 as the response 54, are also deleted from the memory in the form management server 200 after transmitting the request to print the form.

As described above, in the third embodiment, the encoded file 52b indicating the correspondence between the non-specific personal information and the Individual Numbers and the encrypted dictionary 52a for decoding the Individual Numbers are managed in the Individual Number management server 300, which is different from the form management server 200. In addition, in the form management server 200, the portion of the Individual Numbers in the encoded file 51b in the form management server 200 is replaced with the codes of the Individual Numbers for management. In the secondary printing, such as the form printing, the form management server 200 acquires the encrypted dictionary 52a for the Individual Numbers from the Individual Number management server 300 to decode the Individual Number and combines the decoded Individual Number with the non-specific personal information.

Accordingly, the Individual Numbers are managed by a dedicated server to improve the security of the Individual Numbers. In addition, although the encrypted dictionary 52a for the Individual Numbers is temporarily transmitted to the form management server 200, the encrypted dictionary 52a for the Individual Numbers is deleted from the form management server 200 after a certain process, such as the form printing, is completed. As a result, it is possible to suppress a reduction in the confidentiality of the Individual Numbers.

Although the employee numbers are not encoded in the encoded file 52b in the third embodiment, the employee numbers may be encoded. In such a case, the encoded dictionary used for encoding of the employee numbers is included in the encrypted dictionary 52a, as in the encrypted dictionary 33a of the second embodiment.

Other Embodiments

Although the example in which the especially highly confidential specific personal information is the Individual Number is described in the above description, other information may be used as the specific personal information. For example, credit card numbers or various passwords are capable of being securely managed as the specific personal information.

Although the embodiments are described above, the components indicated in the embodiments may be replaced with other components having similar functions. In addition, other arbitrary components or processes may be added. Furthermore, arbitrary two or more components (features) in the embodiments described above may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    acquiring a first data file including a plurality of first records each having a first data value of a first data item and a second data value of a second data item;
    generating first association information indicating a correspondence between each of a plurality of first data values of the first data item and coded data values;
    encoding the first data file based on the first association information, the encoded first data file including the coded data values corresponding to the plurality of first data values included in the plurality of first records;
    encrypting the first association information;
    obtaining a plurality of data values of the second data item included in a second data file including a plurality of second records each having the data value of the second data item;
    specifying the plurality of first data values, included in the plurality of first records, corresponding to the plurality of data values included in the second data files;
    specifying a plurality of coded data values, included in the encoded first data file, corresponding to the plurality of specified first data values;
    merging the plurality of second records and the plurality of specified coded data values; and
    outputting a third data file in which the plurality of second records and the plurality of specified coded data values are merged.

2. The non-transitory computer-readable storage medium according to claim 1,
    the specifying the plurality of first data values includes:
    specifying a plurality of second data values in the first data file corresponding to the plurality of data values included in the second data files based on the plurality of first records; and
    specifying a plurality of first data values corresponding to the plurality of specified second data values in the first data file.

3. The non-transitory computer-readable storage medium according to claim 1, wherein the process further comprises:
    generating second association information indicating a correspondence between each of the plurality of second data values of the first data item and the coded data values; and wherein
    the encoding encodes the first data file further based on the second association information, the encoded first data file including the coded data values corresponding to the plurality of second data values included in the plurality of first records.

4. The non-transitory computer-readable storage medium according to claim 1, wherein
    the third data file further includes the encrypted first association information.

5. The non-transitory computer-readable storage medium according to claim 1, the process further comprising:
    the encrypted first association information and the third data file are stored in different storage devices.

6. A data generating apparatus comprising:
    a memory; and
    a processor coupled to the memory and the processor configured to:
        acquire a first data file including a plurality of first records each having a first data value of a first data item and a second data value of a second data item;
        generate first association information indicating a correspondence between each of a plurality of first data values of the first data item and coded data values;
        encode the first data file based on the first association information, the encoded first data file including the coded data values corresponding to the plurality of first data values included in the plurality of first records;
        encrypt the first association information;
        obtain a plurality of data values of the second data item included in a second data file including a plurality of second records each having the data value of the second data item;

specify the plurality of first data values, included in the plurality of first records, corresponding to the plurality of data values included in the second data files;

specify a plurality of coded data values, included in the encoded first data file, corresponding to the plurality of specified first data values;

merge the plurality of second records and the plurality of specified coded data values; and output a third data file in which the plurality of second records and the plurality of specified coded data values are merged.

7. A computer-implemented method comprising:

acquiring a first file from a memory, the first file including a plurality of confidential data values and second data;

creating, with a processor, at least one encoded dictionary including a correspondence between each of the plurality of confidential data, each of a plurality of second data values of the second data, and a corresponding code value;

encoding the first file based on the at least one first encoded dictionary;

encrypting the confidential data;

combining the encrypted confidential data with the encoded first file to generate combined data;

acquiring a second file that includes a confidential data value and third data having a data field with a value in common with the second data;

generating a third file in which the confidential data value is replaced with the corresponding code value without decrypting the confidential data; and outputting the third file.

8. The method according to claim 7, wherein the at least one encoded dictionary includes a first encoded dictionary indicating a correspondence between each of the plurality of confidential data values and a corresponding code value, and a second encoded dictionary indicating a correspondence between each of the plurality of second data values and a corresponding code value.

9. The method according to claim 8, wherein the second encoded dictionary includes the encrypted confidential data.

10. The method according to claim 9, wherein the second encoded dictionary and the third file are stored in different storage device.

11. The computer-implemented method according to claim 7, wherein the encrypting encrypts according to the Advanced Encryption Standard (AES).

12. The computer-implement method according to claim 7, wherein the confidential data includes a plurality of individual numbers each uniquely identifying a person and the second data includes non-specific personal information including a plurality of employee numbers corresponding to the plurality of individual numbers, the method further comprising:

encoding each of the plurality of individual numbers and a corresponding one of the plurality of employee numbers into a plurality of respective codes having a data length shorter than a length of the plurality of individual numbers and the corresponding one of the plurality of employee numbers to create a compressed file; and the encrypting encrypts a portion of the compressed file corresponding to the plurality of individual numbers to create a partially encrypted file.

* * * * *